United States Patent
Feng

(10) Patent No.: US 12,022,162 B2
(45) Date of Patent: Jun. 25, 2024

(54) VOICE PROCESSING METHOD AND APPARATUS, ELECTRONIC DEVICE, AND COMPUTER READABLE STORAGE MEDIUM

(71) Applicant: BEIJING BYTEDANCE NETWORK TECHNOLOGY CO., LTD., Beijing (CN)

(72) Inventor: Suiyu Feng, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 148 days.

(21) Appl. No.: 17/638,618

(22) PCT Filed: Aug. 11, 2020

(86) PCT No.: PCT/CN2020/108445
§ 371 (c)(1),
(2) Date: Feb. 25, 2022

(87) PCT Pub. No.: WO2021/036782
PCT Pub. Date: Mar. 4, 2021

(65) Prior Publication Data
US 2022/0345787 A1 Oct. 27, 2022

(30) Foreign Application Priority Data
Aug. 28, 2019 (CN) .......................... 201910799011.3

(51) Int. Cl.
*H04N 21/485* (2011.01)
*H04N 21/439* (2011.01)
*H04N 21/44* (2011.01)

(52) U.S. Cl.
CPC ..... *H04N 21/4852* (2013.01); *H04N 21/4394* (2013.01); *H04N 21/4396* (2013.01); *H04N 21/44008* (2013.01)

(58) Field of Classification Search
CPC ....... H04S 7/304; H04S 7/40; H04R 2499/15; G06F 3/165; G06F 3/048
(Continued)

(56) References Cited

U.S. PATENT DOCUMENTS 9,563,265 B2 * 2/2017 You .......................... G06F 3/167
10,531,222 B2 * 1/2020 Tsingos .................... H04R 5/02
(Continued)

FOREIGN PATENT DOCUMENTS

| CN | 106817596 A | 6/2017 |
| CN | 106921866 A | 7/2017 |

(Continued)

OTHER PUBLICATIONS

International Patent Application No. PCT/CN2020/108445; Int'l Search Report; dated Nov. 18, 2020; 2 pages.

*Primary Examiner* — Disler Paul
(74) *Attorney, Agent, or Firm* — BakerHostetler

(57) ABSTRACT

A sound processing method, a sound processing apparatus, an electronic device and a computer-readable storage medium are provided in the present disclosure. The sound processing method includes: acquiring a video image from a video source in response to receiving a first trigger signal; superimposing a first virtual object in the video image in response to receiving a second trigger signal; acquiring attribute information of the first virtual object; acquiring a sound and a sound parameter corresponding to the first virtual object according to the attribute information; and
(Continued)

adjusting the sound according to the sound parameter to obtain a sound corresponding to a state of the first virtual object.

20 Claims, 5 Drawing Sheets

(58) Field of Classification Search
USPC .......................... 381/388, 306, 333, 61, 104
See application file for complete search history.

(56) References Cited

U.S. PATENT DOCUMENTS

| | | | |
|---|---|---|---|
| 11,363,401 B2* | 6/2022 | Laaksonen | H04N 21/8106 |
| 11,666,825 B2* | 6/2023 | Delamont | G06T 19/006 |
| | | | 463/32 |
| 11,895,426 B2* | 2/2024 | Chen | H04N 5/772 |

FOREIGN PATENT DOCUMENTS

| | | |
|---|---|---|
| CN | 107179908 A | 9/2017 |
| CN | 107437272 A | 12/2017 |
| CN | 107871339 A | 4/2018 |
| CN | 109144610 A | 1/2019 |
| CN | 109462776 A | 3/2019 |
| CN | 110072046 A | 7/2019 |
| JP | 2002-298557 A | 10/2002 |
| WO | WO 2009/039636 A1 | 4/2009 |
| WO | WO 2016/153618 A1 | 9/2016 |

* cited by examiner

VOICE PROCESSING METHOD AND APPARATUS, ELECTRONIC DEVICE, AND COMPUTER READABLE STORAGE MEDIUM

REFERENCE TO RELATED APPLICATION

The present application is the national phase application of PCT International Patent Application No. PCT/CN2020/108445, filed Aug. 11, 2020 which claims priority to Chinese Patent Application No. 201910799011.3, titled "VOICE PROCESSING METHOD AND APPARATUS, ELECTRONIC DEVICE, AND COMPUTER READABLE STORAGE MEDIUM", filed on Aug. 28, 2019 with the Chinese Patent Office, both of which are incorporated herein by reference in their entireties.

FIELD

The present disclosure relates to the field of sound processing, and in particular to a sound processing method, a sound processing apparatus, an electronic device, and a computer readable storage medium.

BACKGROUND

With the development of computer networks and the popularization of smart phones, users can no longer be satisfied with expressing their emotions simply by pictures and words. Videos become more favorable because of their diversity in contents and forms which bring intuitive feeling for users. More and more ordinary users create original videos. However, on one hand, the expression of original videos captured by ordinary users is unexciting. On the other hand, more and more video special effects are used in film and television works, which bring more diversity in expression. The video special effects can support and guarantee a successful film or television work.

Currently, video special effects normally do not include sound effects, or encapsulated with fixed sound effects. A sound effect has to be added in advance, which is not only time-consuming and laborious, but also inflexible. The above technical solution cannot handle video special effects that change in real time.

SUMMARY

This summary is provided to introduce the idea in a simplified form. The idea will be described in detail in the following description. This summary is neither intended to identify key features or essential features of the claimed technical solution, nor intended to be used to limit the scope of the claimed technical solution.

In a first aspect, a sound processing method is provided according to embodiments of the present disclosure, which includes:
  acquiring a video image from a video source in response to receiving a first trigger signal;
  superimposing a first virtual object in the video image in response to receiving a second trigger signal;
  acquiring attribute information of the first virtual object;
  acquiring a sound and a sound parameter corresponding to the first virtual object according to the attribute information; and
  adjusting the sound according to the sound parameter to obtain a sound corresponding to a state of the first virtual object.

In a second aspect, a sound processing apparatus is provided according to embodiments of the present disclosure, which includes:
  a video image acquiring module, configured to acquire a video image from a video source in response to receiving a first trigger signal;
  a virtual object display module, configured to superimpose a first virtual object in the video image in response to receiving a second trigger signal;
  a virtual object attribute information acquiring module, configured to acquire attribute information of the first virtual object;
  a sound and parameter acquiring module, configured to acquire a sound and a sound parameter corresponding to the first virtual object according to the attribute information; and
  a sound adjusting module, configured to adjust the sound according to the sound parameter to obtain a sound corresponding to a state of the first virtual object.

In a third aspect, an electronic device is provided according to embodiments of the present disclosure, which includes at least one processor, and a memory in communication connection with the at least one processor. The memory stores instructions executable by the at least one processor, so that the at least one processor performs any sound processing method in the first aspect.

In a fourth aspect, a non-transitory computer-readable storage medium is provided according to embodiments of the present disclosure, which stores computer instructions. The computer instructions are used to cause a computer to perform any sound processing method in the first aspect.

A sound processing method, a sound processing apparatus, an electronic device and a computer-readable storage medium are provided in the present disclosure. The sound processing method includes: acquiring a video image from a video source in response to receiving a first trigger signal; superimposing a first virtual object in the video image in response to receiving a second trigger signal; acquiring attribute information of the first virtual object; acquiring a sound and a sound parameter corresponding to the first virtual object according to the attribute information; and adjusting the sound according to the sound parameter to obtain a sound corresponding to a state of the first virtual object. The above method solves the technical problems in the prior art that the video special effects need to be dubbed later and the sound effects of the video special effects are inflexible.

The above description is only an overview of the technical solutions of the present disclosure. For better understanding of the technical solutions of the present disclosure and implementing the technical solutions according to the specification, and to make the above and other objectives, features and advantages of the technical solutions in the present disclosure clearer, the detailed description is provided below with reference to preferred embodiments and the accompanying drawings.

BRIEF DESCRIPTION OF THE DRAWINGS

The above and other features, advantages and aspects of various embodiments of the present disclosure will become more clear when taken in conjunction with the accompanying drawings and with reference to the following detailed description. Throughout the drawings, the same or similar reference numbers refer to the same or similar elements. It

DETAILED DESCRIPTION

Figure 1:
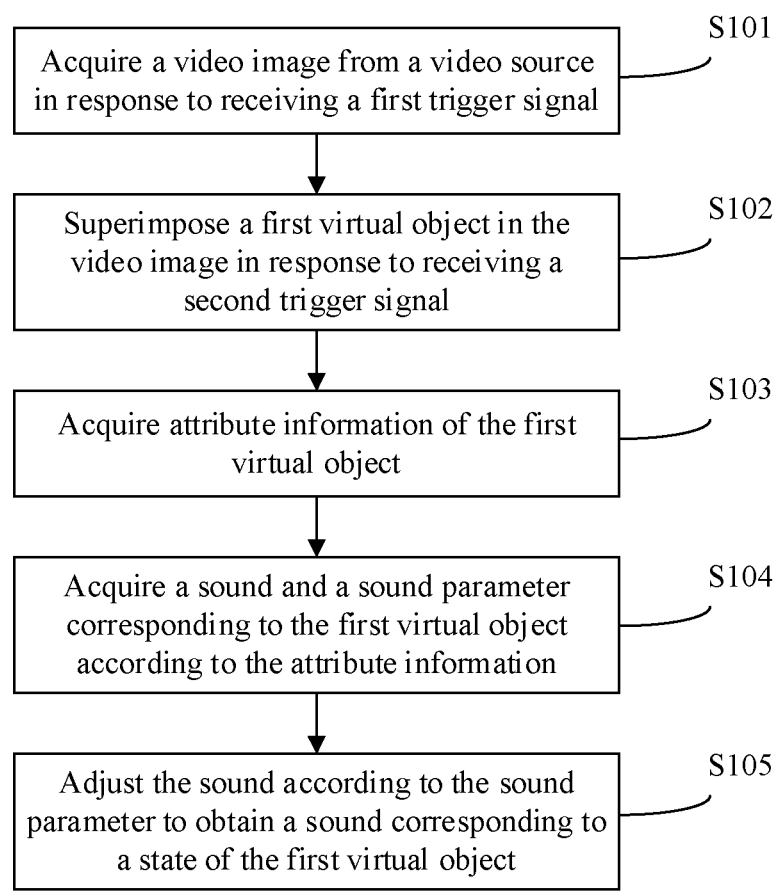
FIG. 1 is a flowchart of a sound processing method according to an embodiment of the present disclosure.
Figure 2:
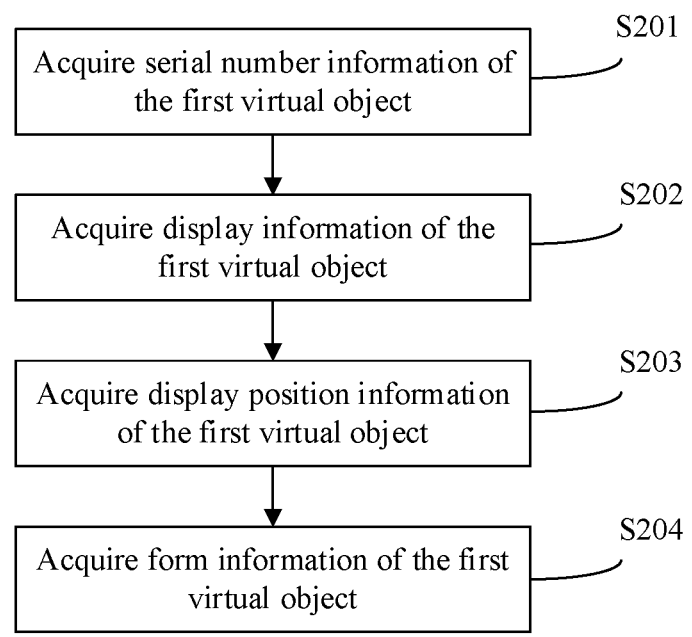
FIG. 2 is a flowchart of step S103 of a sound processing method according to an embodiment of the present disclosure.
Figure 3:
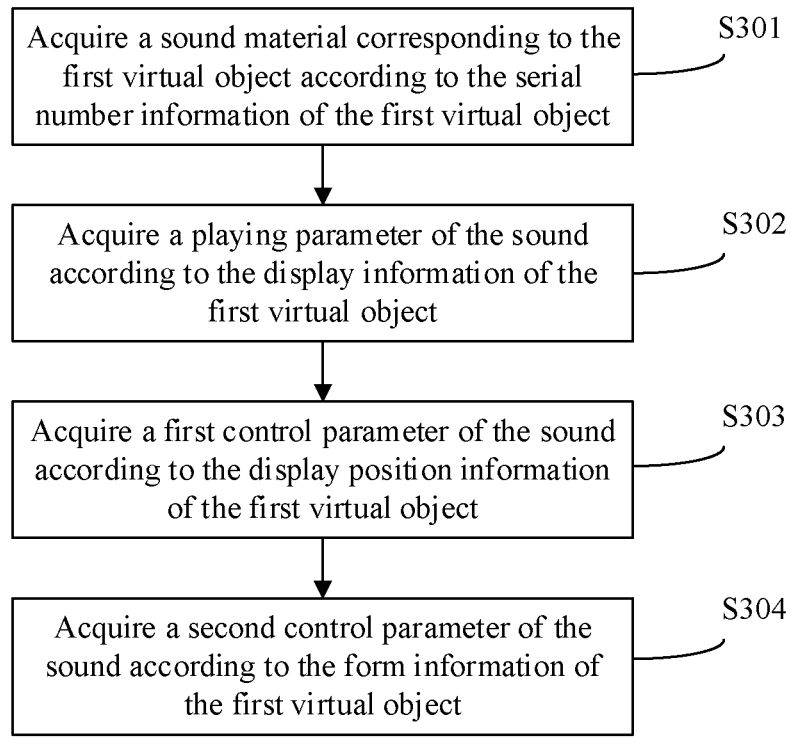
FIG. 3 is a flowchart of step S104 of a sound processing method according to an embodiment of the present disclosure.
Figure 4:
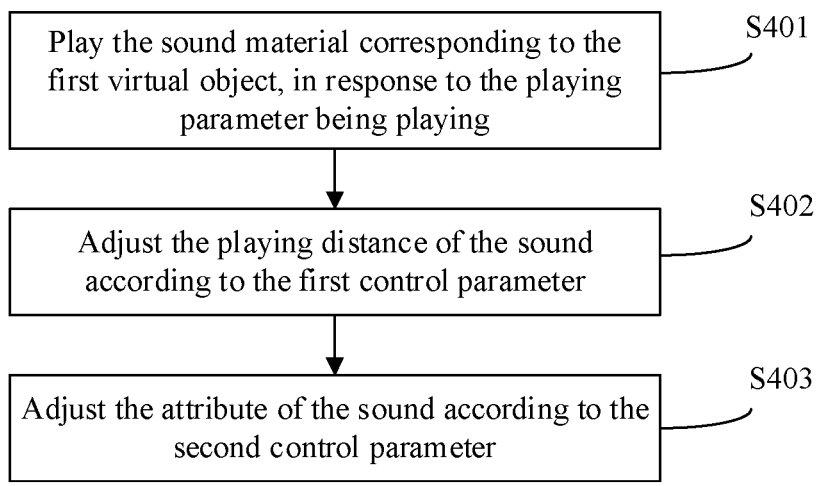
FIG. 4 is a flowchart of step S105 of a sound processing method according to an embodiment of the present disclosure.
Figure 5:
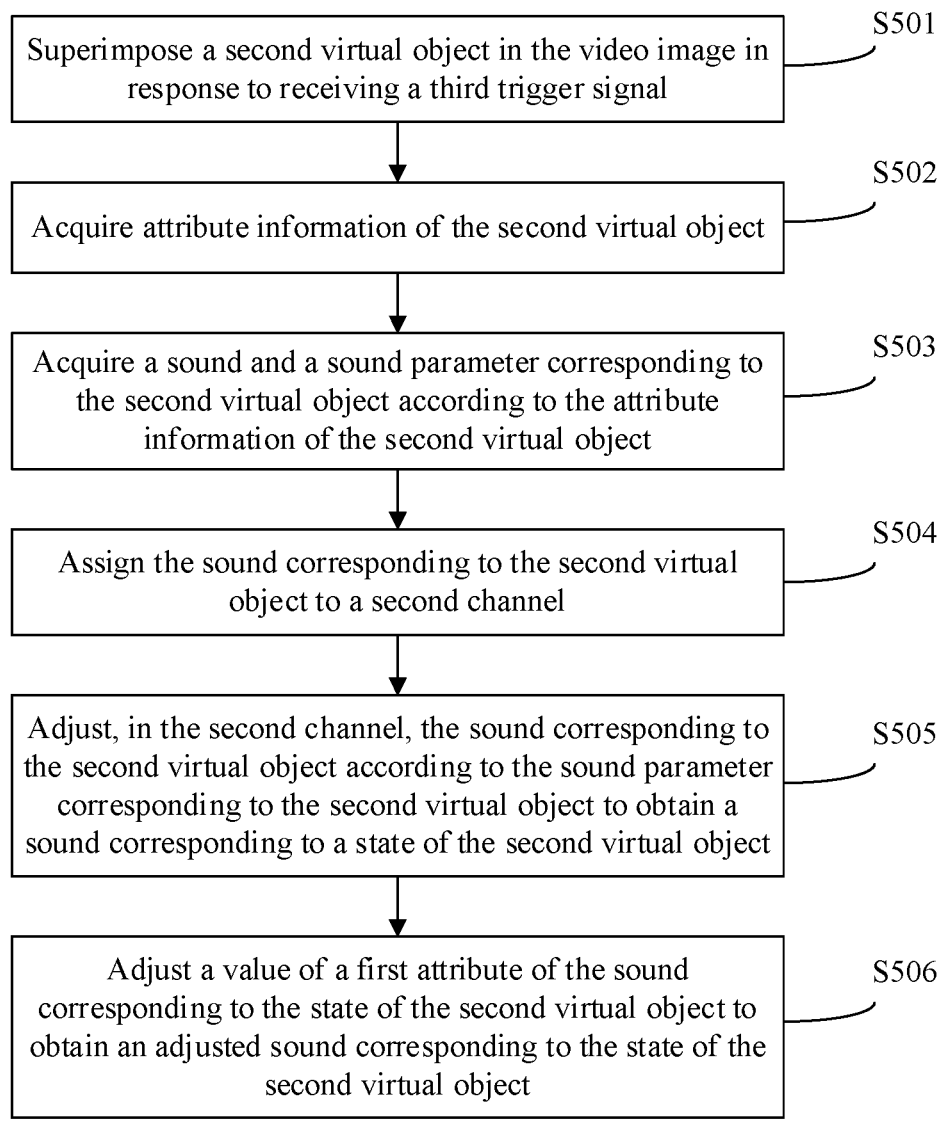
FIG. 5 is a flowchart of a further sound processing method according to another embodiment of the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as being limited to the embodiments set forth herein. The embodiments are provided for a more thorough and complete understanding. It should be understood that the drawings and embodiments of the present disclosure are only provided as examples, and are not intended to limit the protection scope of the present disclosure.

It should be understood that the various steps described in the method embodiments of the present disclosure may be performed in different orders and/or in parallel. Furthermore, method embodiments may include additional steps and/or omit an illustrated step. The scope of the present disclosure is not limited in this regard.

As used herein, the terms "including" and "comprising" and variations thereof are non-exclusive, i.e., meaning "including but not limited to". The term "based on" means "at least partially based on". The term "an embodiment" means "at least one embodiment", the term "another embodiment" means "at least one another embodiment", and the term "some embodiments" means "at least some embodiments". Relevant definitions of other terms will be given in the description below.

It should be noted that concepts such as "first" and "second" mentioned in the present disclosure are only used to distinguish different devices, modules or units, and are not used to limit the order or interdependence of functions performed by these devices, modules or units.

It should be noted that the modifications of "a" and "a plurality" mentioned in the present disclosure are illustrative rather than restrictive, and those skilled in the art should understand that unless clearly indicated otherwise, they should be understood as "one or more".

The names of messages or information exchanged between multiple devices in the embodiments of the present disclosure are only for illustrative purposes, and are not intended to limit the scope of these messages or information.

FIG. 1 is a flowchart of a sound processing method according to an embodiment of the present disclosure. The sound processing method provided in this embodiment may be executed by a sound processing apparatus. The sound processing apparatus may be implemented as software, or implemented as a combination of software and hardware. The sound processing apparatus may be integrated in a device of a sound processing system, such as a sound processing server or a sound processing terminal device. As shown in FIG. 1, the method includes the following steps S101 to S105.

In step S101, a video image is acquired from a video source in response to receiving a first trigger signal.

In some embodiments, the first trigger signal is a signal generated by the user touching a predetermined area of the screen in the mobile terminal. In an example, the predetermined area may be a virtual button displayed on the screen of the mobile terminal. A sound processing program is started when the virtual button is touched by a user.

In some embodiments, the first trigger signal is a predetermined voice signal. In an example, a user starts the sound processing program by speaking a predetermined word or sentence.

When the first trigger signal is received, the step of acquiring a video image is triggered.

In some embodiments, in this step, the video source is an image sensor, and the video image is a video image received from the image sensor. The image sensor may be any devices that can collect images. Typical image sensors are cameras and the like. In this embodiment, the image sensor may be a camera on a terminal device, such as a front or rear camera on a smartphone, and the image collected by the camera may be directly displayed on the display screen of the smartphone.

In some embodiments, in this step, the video source is a memory, The video image is a video image file received from the memory. The video image file is a video recorded in advance and stored in the memory. In some embodiments, the storage is a local storage or a network storage.

It can be understood that the above-mentioned specific examples of the first trigger signal and the video source are all examples, and do not constitute a limitation of the present disclosure. In fact, any method of obtaining a video image in response to a trigger signal can be applied to the present disclosure, which will not be described in detail.

In step S102, a first virtual object is superimposed in the video image in response to receiving a second trigger signal.

In some embodiments, the second trigger signal is a signal generated by the user touching a predetermined area of the screen in the mobile terminal. In an example, the predetermined area may be a virtual button displayed on the screen of the mobile terminal. For example, when the user clicks a "display special effect" button, the video special effect corresponding to the button is superimposed on the video image.

In some embodiments, the second trigger signal is that a predetermined event occurs in the video image. In an example, the predetermined event is detecting that a first target object appears in the video image, where the first target object may be a preset object such as a human face, a human hand, or the like. In an example, the predetermined event is detecting that the first target object in the video image performs a first action. For example, the first target object is a human hand, and the predetermined event is that the human hand stretches out its five fingers. When a predetermined event occurs, a first virtual object may be superimposed at a predetermined position on the first target object. In some embodiments, the superimposing the first virtual object in the video image in response to receiving the second trigger signal includes: in response to detecting that the first target object in the video image performs a first action, superimposing a first virtual object at a predetermined position on the first target object. In an example, the first target object is a human hand, and the first virtual object is a flame. When the human hand stretches out five fingers, a flame effect is superimposed at the center of the human hand.

In some embodiments, the superimposing the first virtual object in the video image is to render the first virtual object at a predetermined position of the video image. In this case, the position of the first virtual object is coordinates on the video image, and the first virtual object is always rendered at a fixed position in the video image no matter how the video image changes.

In some embodiments, the superimposing the first virtual object in the video image is to render the first virtual object at a position corresponding to a key point of the first target object in the video image. The position of the virtual object may follow the first target object. The position corresponding to the key point of the first target object may be the position of the key point, or may be in a preset positional relationship with the key point.

It can be understood that the above-mentioned specific examples of the second trigger signal and the superimposition of the first virtual object are all examples, and do not constitute a limitation of the present disclosure. In fact, any method of rendering a virtual object in a video image in response to a trigger signal can be applied to the present disclosure, which will not be described herein.

In step S103, attribute information of the first virtual object is acquired.

In some embodiments, the acquiring the attribute information of the first virtual object includes the following steps S201 to S204.

In step S201, serial number information of the first virtual object is acquired, where the serial number information uniquely identifies the first virtual object.

In step S202, display information of the first virtual object is acquired, where the display information indicates whether the first virtual object is being displayed.

In step S203, display position information of the first virtual object is acquired, where the display position information is coordinates of the first virtual object in the video image.

In step S204, form information of the first virtual object is acquired, where the form information is one or more of shape information, size information, and color information of the first virtual object.

The number information of the first virtual object is ID information of the first virtual object. A sound material corresponding to the first virtual object may be obtained according to the ID information. The display information of the first virtual object indicates whether the first virtual object is in a display state. In an example, a flag is used to represent the display state. If the value of the flag is 0, the first virtual object is not displayed. If the value of the flag is 1, the first virtual object is displayed in the video image. The display position information of the first virtual object is the coordinates of the first virtual object in the video image. In an example, the coordinate range is [−1, 1]. For example, the coordinates of the first virtual object are X=−1, Y=1, which means that the first virtual object is located in the upper left corner of the video image. The form information of the first virtual object includes at least one or more of shape information, size information and color information of the first virtual object. In an example, the first virtual object is a flame. The form information of the first virtual object may include the height, width and color of the flame.

It can be understood that the attribute information of the first virtual object is not limited to the above. In fact, any attribute information can be applied to the present disclosure, and details are not described herein.

In step S104, a sound and a sound parameter corresponding to the first virtual object are acquired according to the attribute information.

In some embodiments, the acquiring the sound and sound parameters corresponding to the first virtual object according to the attribute information includes the following steps S301 to S304.

In step S301, a sound material corresponding to the first virtual object is acquired according to the serial number information of the first virtual object.

In step S302, a playing parameter of the sound is acquired according to the display information of the first virtual object, where the playing parameter is used to determine whether to play the sound.

In step S303, a first control parameter of the sound is acquired according to the display position information of the first virtual object, where the first control parameter is used to determine a playing distance of the sound.

In step S304, a second control parameter of the sound is acquired according to the form information of the first virtual object, where the second control parameter is used to determine an attribute of the sound.

In step S301, for example, the first virtual object is a flame, and sound materials of the flame is obtained from a configuration file according to the ID of the flame. The sound materials may include the sound of ignition, the sound of burning and the sound of extinguishing a fire, and may include some other sound materials corresponding to some special flame states, such as the sound of a spark. In step S302, the sound material to be played can be determined according to the playing parameter of the sound. If the display information of the first virtual object indicates that the first virtual object is displayed, a playing parameter of playing a sound is obtained. In the above example, the sound of ignition is played in this case. If the display information of the first virtual object indicates that the first virtual object is not displayed, the playing parameter of turning off the sound is obtained. In the above example, the sound of extinguishing a fire is played in this case. In step S303, the first control parameter of the sound is obtained according to the display position information of the first virtual object, and the first control parameter controls the distance of the sound. In an example, the origin of the sound can be set at the position of the center point (0,0) of the video image, the distance between the display position and the position of the center point can be used to obtain the first control parameter for controlling the sound distance. In step S304, according to the form information of first virtual object, the second control parameter of the sound is obtained. Typical form information includes shape, size, color, and the like. In the above example, if the flame is high and wide, the sound of burning is loud and is wide in sound field. The sound can be controlled to be a normal burning sound or a soft burning sound according to the color of the flame.

It can be understood that the attribute information of the virtual object is not limited to the above information, the control parameters of the sound are not limited to the above control parameters, and for some sound effects, the above control parameters can be used selectively, which will not be described in detail.

In step 105, the sound is adjusted according to the sound parameter to obtain a sound corresponding to a state of the first virtual object.

In some embodiments, the adjusting the sound according to the sound parameter to obtain the sound corresponding to the state of the first virtual object includes the following steps S401 to S403.

In step S401, the sound material corresponding to the first virtual object is played in response to the playing parameter being playing.

In step S402, the playing distance of the sound is adjusted according to the first control parameter.

In step S403, the attribute of the sound is adjusted according to the second control parameter.

Corresponding to the situation where the first virtual object is just displayed, the playing parameter is playing. In this case, the sound materials corresponding to the first virtual object is directly played. In an example, sound materials are played in a certain order. As in the above example, if the first virtual object is a flame, the sound of ignition is played first, and after the sound of ignition is played, the sound of continuous burning is played. In step S402 and step S403, the playing distance of the sound is adjusted using the first control parameter. In an example, the center point of the video image is used as a user position, and the head related transfer function (HRTF) is used to calculate the distance and angle of the sound source from the user position according to the above coordinates. The intensity of the sound is adjusted according to the HRTF calculation to simulate the distance and angle of the sound. The second control parameter is used to adjust the attribute of the sound. For example, the height, width or area of the flame has a proportional relationship with the volume of the flame burning sound. When the height, width or area of the flame becomes larger, the sound of the flame burning becomes louder, and when the height, width or area of the flame becomes smaller, the sound of the flame becomes less loud.

In some embodiments, the adjusting the sound according to the sound parameter to obtain the sound corresponding to the state of the first virtual object includes: in response to the playing parameter being off, turning off the sound corresponding to the first virtual object. Specifically, when the playing parameter is changed to be "off", for example, the playing parameter of the flame is set to 0 (i.e., off) when the human hand makes a fist, the sound material for turning off the flame is played first, and then all sounds corresponding to the flame are turned off, so that no sound can be heard.

In this step, the sound parameter is determined according to the attribute of the first virtual object, and the attribute of the first virtual object may be changed in real time, for example, according to the change of the target object. Therefore, sound effects are added to the first virtual object in real time without requiring applying the sound effects to the virtual object in advance.

In another optional embodiment, there may be multiple virtual objects. In this case, multiple sounds corresponding to the multiple virtual objects need to be processed separately. In order to separately process the multiple sounds, after acquiring the sound and sound parameters corresponding to the first virtual object, the method further includes step S106.

In step S106, the sound corresponding to the first virtual object is assigned to a first channel.

The adjusting the sound according to the sound parameter to obtain the sound corresponding to the state of the first virtual object includes: adjusting, in the first channel, the sound according to the sound parameter to obtain the sound corresponding to the state of the first virtual object.

In order to separately process the sounds, in this embodiment, the sounds corresponding to different virtual objects are assigned to different channels, and the sounds are respectively processed in the channels. For sounds generated for the same type of virtual objects, since they are processed in separate channels, they can be easily processed separately.

In this optional embodiment, the method further includes the following steps S501 to S506.

In step S501, a second virtual object is superimposed in the video image in response to receiving a third trigger signal.

In step S502, attribute information of the second virtual object is acquired.

In step S503, a sound and a sound parameter corresponding to the second virtual object are acquired according to the attribute information of the second virtual object.

In step S504, the sound corresponding to the second virtual object is assigned to a second channel.

In step S505, in the second channel, the sound corresponding to the second virtual object is adjusted according to the sound parameter corresponding to the second virtual object to obtain a sound corresponding to a state of the second virtual object.

In step S506, a value of a first attribute of the sound corresponding to the state of the second virtual object is adjusted to obtain an adjusted sound corresponding to the state of the second virtual object.

In this embodiment, after the first virtual object is superimposed, a second virtual object is also superimposed in the video image. In an example, the second virtual object may be a flame corresponding to another human hand. For example, a first flame is superimposed on the left hand, and a second flame is superimposed on the right hand. The flames are the same, so that their sound materials are the same, but their parameters for controlling the sound are different. Therefore, the sound of the first flame is put into the first channel for processing, and the sound of the second flame is put into the second channel for processing. The specific processing of the sound corresponding to the second virtual object is similar to that of the sound corresponding to the first virtual object, with the only difference that in step S506, the value of the first attribute of the sound corresponding to the state of the second virtual object is adjusted. In an example, the first attribute is the pitch of the sound. For example, the pitch of the sound in the second channel is always lowered by 30%, so that the sound in the first channel and the sound in the second channel can be better distinguished.

A sound processing method, a sound processing apparatus, an electronic device and a computer-readable storage medium are provided in the present disclosure. The sound processing method includes: acquiring a video image from a video source in response to receiving a first trigger signal; superimposing a first virtual object in the video image in response to receiving a second trigger signal; acquiring attribute information of the first virtual object; acquiring a sound and a sound parameter corresponding to the first virtual object according to the attribute information; and adjusting the sound according to the sound parameter to obtain a sound corresponding to a state of the first virtual object. The above method solves the technical problems in the prior art that the video special effects need to be dubbed later and the sound effects of the video special effects are inflexible.

In the above, although the steps in the above method embodiments are described in the above order, it should be understood by those skilled in the art that the steps in the embodiments of the present disclosure are not necessarily executed in the above order, and may be performed in a reverse order, in parallel, in interleaved or in other orders. On the basis of the above steps, those skilled in the art may also add other steps. These obvious modifications or equivalents should also fall in the protection scope of the present disclosure.

Figure 6:
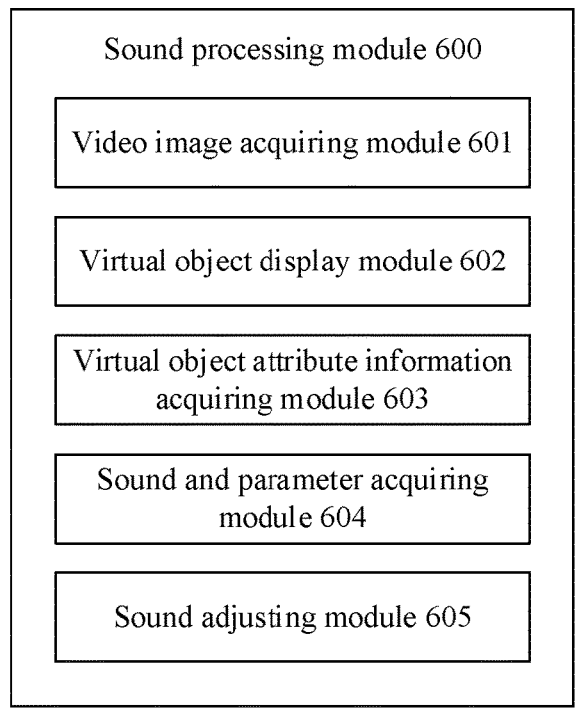
FIG. 6 is a schematic structural diagram of a sound processing apparatus according to an embodiment of the present disclosure.

FIG. 6 is a schematic structural diagram of a sound processing apparatus provided by an embodiment of the present disclosure. As shown in FIG. 6, the apparatus 600 includes: a video image acquiring module 601, a virtual object display module 602, a virtual object attribute information acquiring module 603, a sound and parameter acquiring module 604 and a sound adjusting module 605.

The video image acquiring module 601 is configured to acquire a video image from a video source in response to receiving a first trigger signal.

The virtual object display module 602 is configured to superimpose a first virtual object in the video image in response to receiving a second trigger signal.

The virtual object attribute information acquiring module 603 is configured to acquire attribute information of the first virtual object.

The sound and parameter acquiring module 604 is configured to acquire a sound and a sound parameter corresponding to the first virtual object according to the attribute information.

The sound adjusting module 605 is configured to adjust the sound according to the sound parameter to obtain a sound corresponding to a state of the first virtual object.

Further, the virtual object display module 602 may further include a virtual object superimposing module, configured to superimpose, in response to detecting that a first target object in the video image performs a first action, the first virtual object at a predetermined position on the first target object.

Further, the virtual object attribute information acquiring module 603 may include:
a serial number information acquiring module, configured to acquire serial number information of the first virtual object, where the serial number information uniquely identifies the first virtual object;
a display information acquiring module, configured to acquire display information of the first virtual object, where the display information indicates whether the first virtual object is being displayed;
a position information acquiring module, configured to acquire display position information of the first virtual object, where the display position information is coordinates of the first virtual object in the video image; and
a form information acquiring module, configured to acquire form information of the first virtual object, where the form information is one or more of shape information, size information, and color information of the first virtual object.

Further, the sound and parameter acquiring module 604 may include:
a sound material acquiring module, configured to acquire a sound material corresponding to the first virtual object according to the serial number information of the first virtual object;
a playing parameter acquiring module, configured to acquire a playing parameter of the sound according to the display information of the first virtual object, where the playing parameter is used to determine whether to play the sound;
a first control parameter acquiring module, configured to acquire a first control parameter of the sound according to the display position information of the first virtual object, where the first control parameter is used to determine the playing distance of the sound; and
a second control parameter acquiring module, configured to acquire a second control parameter of the sound according to the form information of the first virtual object, where the second control parameter is used to determine the attribute of the sound.

Further, the sound adjusting module 605 may further include:
a playing module, configured to play the sound material corresponding to the first virtual object in response to the playing parameter being playing;
a distance adjusting module, configured to adjust the playing distance of the sound according to the first control parameter; and
an attribute adjusting module, configured to adjust the attribute of the sound according to the second control parameter.

Further, the sound adjusting module 605 may include a turning-off module, configured to turn off the sound corresponding to the first virtual object in response to the playing parameter being off.

Further, the sound processing device 600 may further include a first channel assigning module, configured to assign the sound corresponding to the first virtual object to a first channel.

The sound adjusting module 605 is configured to adjust, in the first channel, the sound according to the sound parameter to obtain the sound corresponding to the state of the first virtual object.

Further, the sound processing device 600 may further include:
a first virtual object display module, configured to superimpose a second virtual object in the video image in response to receiving a third trigger signal;
a first attribute information acquiring module, configured to acquire attribute information of the second virtual object;
a first sound and parameter acquiring module, configured to acquire a sound and a sound parameter corresponding to the second virtual object according to the attribute information of the second virtual object;
a second channel assigning module, configured to assign the sound corresponding to the second virtual object to a second channel;
a first sound adjusting module, configured to adjust, in the second channel, the sound corresponding to the second virtual object according to the sound parameter corresponding to the second virtual object to obtain a sound corresponding to a state of the second virtual object; and
a first attribute adjusting module, configured to adjust a value of a first attribute of the sound corresponding to the state of the second virtual object to obtain an adjusted sound corresponding to the state of the second virtual object.

The apparatus shown in FIG. 6 may execute the methods of the embodiments shown in FIG. 1 to FIG. 5. For parts not described in detail in this embodiment, reference may be made to the related description of the embodiments shown in FIG. 1 to FIG. 5. For the execution process and technical effects of the technical solution, one may refer to the descriptions in the embodiments shown in FIG. 1 to FIG. 5, which will not be repeated here.

Figure 7:
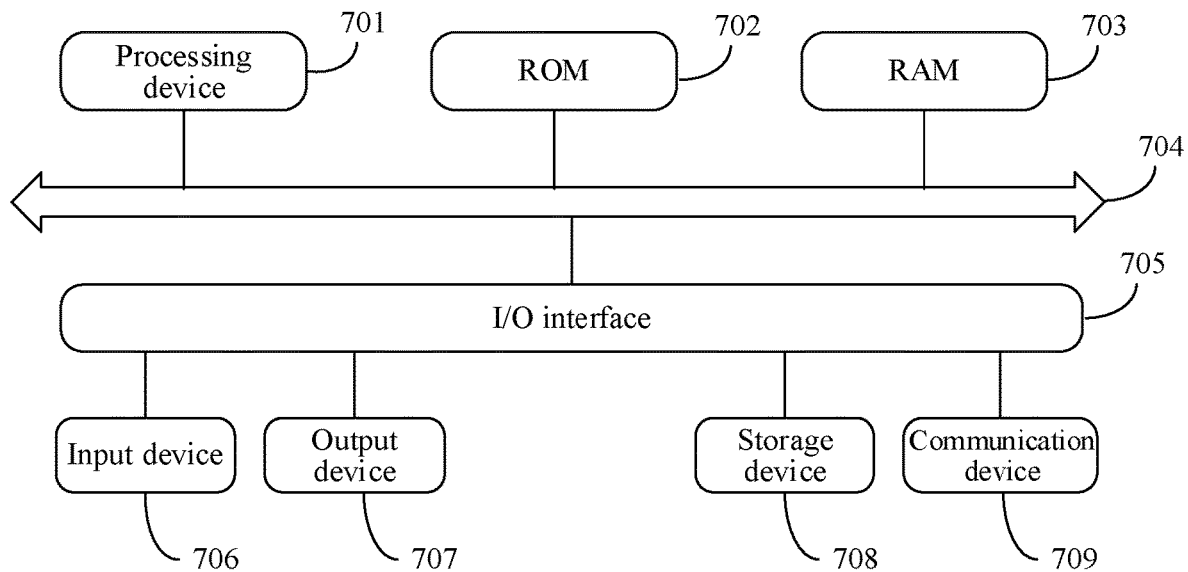
FIG. 7 is a schematic structural diagram of an electronic device according to an embodiment of the present disclosure.

FIG. 7 shows a schematic structural diagram of an electronic device 700 suitable for implementing the embodiments of the present disclosure. Terminal devices in the embodiments of the present disclosure may include, but are not limited to, mobile terminals, such as mobile phones, notebook computers, digital broadcast receivers, PDAs (Personal Digital Assistants), PADs (Tablet computers), PMPs (Portable Multimedia Players), vehicle-mounted terminals (such as in-vehicle navigation terminals), and the like, and fixed terminals such as digital TVs, desktop computers, and the like. The electronic device shown in FIG. 7 is only an example, and should not impose any limitation on the functions and applications of the embodiments of the present disclosure.

As shown in FIG. 7, the electronic device 700 may include a processing device (such as a central processing unit, a graphics processor) 701 that may execute various appropriate actions and processes according to a program stored in a read only memory (ROM) 702 or loaded into random access memory (RAM) 703 from a storage device 706. In the RAM 703, various programs and data necessary for the operation of the electronic device 700 are also stored. The processing device 701, the ROM 702, and the RAM 703 are connected to each other through a bus 704. An input/output (I/O) interface 705 is also connected to the bus 704.

Normally, the following devices may be connected to the I/O interface 705: an input device 706 such as a touch screen, a touchpad, a keyboard, a mouse, a camera, a microphone, an accelerometer, a gyroscope and the like; an output device 707, such as a liquid crystal display (LCD), a speaker, a vibrator and the like; a storage device 706, such as a magnetic tape, a hard disk and the like; and a communication device 709. The communication device 709 may enable the electronic device 700 to communicate in a wireless or wired manner with other devices to exchange data. Although FIG. 7 shows the electronic device 700 having various means, it should be understood that not all of the illustrated means are required to be implemented or provided. More or fewer devices may alternatively be implemented or provided.

In particular, according to embodiments of the present disclosure, the processes described above with reference to the flowcharts may be implemented as computer software programs. For example, embodiments of the present disclosure include a computer program product including a computer program carried on a non-transitory computer readable medium. The computer program includes program code for performing the method illustrated in the flowchart. In such an embodiment, the computer program may be downloaded and installed from the network via the communication device 709, or from the storage device 706, or from the ROM 702. When the computer program is executed by the processing device 701, the above-mentioned functions in the methods of the embodiments of the present disclosure are executed.

It should be noted that the computer-readable medium mentioned above in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus or device, or any combination thereof. More specific examples of computer readable storage media may include, but are not limited to, electrical connections with one or more wires, portable computer disks, hard disks, a random access memory (RAM), a read only memory (ROM), an erasable Programmable read only memory (EPROM or flash memory), a optical fiber, a portable compact disk read only memory (CD-ROM), optical storage devices, magnetic storage devices, or any suitable combination thereof. In this disclosure, a computer-readable storage medium may be any tangible medium that contains or stores a program that can be used by or in conjunction with an instruction execution system, apparatus or device. In the present disclosure, a computer-readable signal medium may include a data signal propagated in baseband or as part of a carrier wave with computer-readable program code embodied thereon. Such propagated data signals may be in a variety of forms, including but not limited to electromagnetic signals, optical signals, or any suitable combination thereof. A computer-readable signal medium can also be any computer-readable medium other than a computer-readable storage medium that can transmit, propagate, or transport the program for use by or in connection with the instruction execution system, apparatus or device. Program code stored on a computer readable medium may be transmitted using any suitable medium including, but not limited to, an electrical wire, an optical fiber cable, RF (radio frequency), or any suitable combination thereof.

In some embodiments, the client and server may use any currently known or future network protocol such as HTTP (HyperText Transfer Protocol) to communicate, and may be connected with digital data network in any form or medium (such as a communication network). Examples of communication networks include local area networks (LAN), wide area networks (WAN), the Internet (eg, the Internet), and peer-to-peer networks (such as ad hoc peer-to-peer networks), as well as any current or future network.

The above-mentioned computer-readable medium may be included in the above-mentioned electronic device, or may exist alone without being assembled into the electronic device.

The above-mentioned computer-readable medium carries one or more programs. The above-mentioned one or more programs, when being executed by the electronic device, cause the electronic device to: receive original audio from an audio source, detect the number of occurrences of multiple pitches in the original audio, and obtain a pitch sequence of the original audio by sorting the detected pitches according to the number of occurrences, and determine the tonality of the original audio according to the pitch sequence.

Computer program code for performing operations of the present disclosure may be written in one or more programming languages, including but not limited to object-oriented programming languages, such as Java, Smalltalk, C++, and conventional procedural programming languages, such as the "C" language or similar programming languages. The program code may be executed entirely on a user computer, or partly on a user computer, or as a stand-alone software package, or partly on a user computer and partly on a remote computer, or entirely on a remote computer or server. In the case of using a remote computer, the remote computer may be connected to the user's computer through any kind of network, including a local area network (LAN) or a wide area network (WAN), or may be connected to an external computer (eg, using Internet connection provided by an Internet service provider).

The flowchart and block diagrams in the Figures illustrate the architecture, functionality, and operations of possible implementations of systems, methods and computer program products according to various embodiments of the present disclosure. In this regard, each block in the flowcharts or block diagrams may represent a module, program segment, or a portion of code that contains one or more executable instructions for implementing the specified logical functions. It should also be noted that, in some alternative implementations, the functions noted in the blocks may occur in an order other than the order shown in the figures. For example, two blocks shown in succession may be executed substantially concurrently, or the blocks may sometimes be executed in the reverse order, depending upon the functionality involved. It is also noted that each block of the block diagrams and/or flowchart illustrations, and combinations of blocks in the block diagrams and/or flowchart illustrations, may be implemented in dedicated hardware-based systems that perform the specified functions or operations, or may be implemented by a combination of dedicated hardware and computer instructions.

The units involved in the embodiments of the present disclosure may be implemented in a software manner, or in a hardware manner. The name of the unit does not constitute a limitation of the unit under any circumstances.

The functions described above may be performed, at least in part, by one or more hardware logic components. For example, without limitation, examples of hardware logic components that may be used include: a Field Programmable Gate Array (FPGA), a Application Specific Integrated Circuit (ASIC), an Application Specific Standard Product (ASSP), a System on Chip (SOC), a Complex Programmable Logical Device (CPLD) and the like.

In the present disclosure, a machine-readable medium may be a tangible medium that may contain or store a program for use by or in connection with the instruction execution system, apparatus or device. The machine-readable medium may be a machine-readable signal medium or a machine-readable storage medium. Machine-readable media may include, but are not limited to, electronic, magnetic, optical, electromagnetic, infrared, or semiconductor systems, devices, or devices, or any suitable combination thereof. More specific examples of machine-readable storage media include one or more wire-based electrical connections, portable computer disks, hard disks, random access memory (RAM), read only memory (ROM), erasable programmable read only memory (EPROM or flash memory), fiber optics, compact disk read only memory (CD-ROM), optical storage devices, magnetic storage devices, or any suitable combination thereof.

According to one or more embodiments of the present disclosure, a sound processing method is provided, including:
  acquiring a video image from a video source in response to receiving a first trigger signal;
  superimposing a first virtual object in the video image in response to receiving a second trigger signal;
  acquiring attribute information of the first virtual object;
  acquiring a sound and a sound parameter corresponding to the first virtual object according to the attribute information; and
  adjusting the sound according to the sound parameter to obtain a sound corresponding to a state of the first virtual object.

Further, the superimposing a first virtual object in the video image in response to receiving a second trigger signal comprises:
  superimposing, in response to detecting that a first target object in the video image performs a first action, the first virtual object at a predetermined position on the first target object.

Further, the acquiring attribute information of the first virtual object comprises:
  acquiring serial number information of the first virtual object, wherein the serial number information uniquely identifies the first virtual object;
  acquiring display information of the first virtual object, wherein the display information indicates whether the first virtual object is being displayed;
  acquiring display position information of the first virtual object, wherein the display position information is coordinates of the first virtual object in the video image; and
  acquiring form information of the first virtual object, wherein the form information is one or more of shape information, size information, and color information of the first virtual object.

Further, the acquiring a sound and a sound parameter corresponding to the first virtual object according to the attribute information comprises:
  acquiring a sound material corresponding to the first virtual object according to the serial number information of the first virtual object;
  acquiring a playing parameter of the sound according to the display information of the first virtual object, wherein the playing parameter is used to determine whether to play the sound;
  acquiring a first control parameter of the sound according to the display position information of the first virtual object, wherein the first control parameter is used to determine a playing distance of the sound; and
  acquiring a second control parameter of the sound according to the form information of the first virtual object, wherein the second control parameter is used to determine an attribute of the sound.

Further, the adjusting the sound according to the sound parameter to obtain a sound corresponding to a state of the first virtual object comprising:
  playing the sound material corresponding to the first virtual object, in response to the playing parameter being playing;
  adjusting the playing distance of the sound according to the first control parameter; and
  adjusting the attribute of the sound according to the second control parameter.

Further, the adjusting the sound according to the sound parameter to obtain a sound corresponding to a state of the first virtual object comprises:
  turning off the sound corresponding to the first virtual object in response to the playing parameter being off.

Further, after the acquiring a sound and a sound parameter corresponding to the first virtual object according to the attribute information, the method further comprises:
  assigning the sound corresponding to the first virtual object to a first channel; and
  the adjusting the sound according to the sound parameter to obtain a sound corresponding to a state of the first virtual object comprises:
  adjusting, in the first channel, the sound according to the sound parameter to obtain the sound corresponding to the state of the first virtual object.

Further, the method further comprises:
  superimposing a second virtual object in the video image in response to receiving a third trigger signal;

acquiring attribute information of the second virtual object;
acquiring a sound and a sound parameter corresponding to the second virtual object according to the attribute information of the second virtual object;
assigning the sound corresponding to the second virtual object to a second channel;
adjusting, in the second channel, the sound corresponding to the second virtual object according to the sound parameter corresponding to the second virtual object to obtain a sound corresponding to a state of the second virtual object; and
adjusting a value of a first attribute of the sound corresponding to the state of the second virtual object to obtain an adjusted sound corresponding to the state of the second virtual object.

According to one or more embodiments of the present disclosure, a sound processing apparatus is provided, including:
a video image acquiring module, configured to acquire a video image from a video source in response to receiving a first trigger signal;
a virtual object display module, configured to superimpose a first virtual object in the video image in response to receiving a second trigger signal;
a virtual object attribute information acquiring module, configured to acquire attribute information of the first virtual object;
a sound and parameter acquiring module, configured to acquire a sound and a sound parameter corresponding to the first virtual object according to the attribute information; and
a sound adjusting module, configured to adjust the sound according to the sound parameter to obtain a sound corresponding to a state of the first virtual object.

Further, the virtual object display module further includes:
a virtual object superimposing module, configured to superimpose, in response to detecting that a first target object in the video image performs a first action, the first virtual object at a predetermined position on the first target object.

Further, the virtual object attribute information acquiring module may includes:
a serial number information acquiring module, configured to acquire serial number information of the first virtual object, where the serial number information uniquely identifies the first virtual object;
a display information acquiring module, configured to acquire display information of the first virtual object, where the display information indicates whether the first virtual object is being displayed;
a position information acquiring module, configured to acquire display position information of the first virtual object, where the display position information is coordinates of the first virtual object in the video image; and
a form information acquiring module, configured to acquire form information of the first virtual object, where the form information is one or more of shape information, size information, and color information of the first virtual object.

Further, the sound and parameter acquiring module includes:
a sound material acquiring module, configured to acquire a sound material corresponding to the first virtual object according to the serial number information of the first virtual object;
a playing parameter acquiring module, configured to acquire a playing parameter of the sound according to the display information of the first virtual object, where the playing parameter is used to determine whether to play the sound;
a first control parameter acquiring module, configured to acquire a first control parameter of the sound according to the display position information of the first virtual object, where the first control parameter is used to determine the playing distance of the sound; and
a second control parameter acquiring module, configured to acquire a second control parameter of the sound according to the form information of the first virtual object, where the second control parameter is used to determine the attribute of the sound.

Further, the sound adjusting module further includes:
a playing module, configured to play the sound material corresponding to the first virtual object in response to the playing parameter being playing;
a distance adjusting module, configured to adjust the playing distance of the sound according to the first control parameter; and
an attribute adjusting module, configured to adjust the attribute of the sound according to the second control parameter.

Further, the sound adjusting module includes:
a turning-off module, configured to turn off the sound corresponding to the first virtual object in response to the playing parameter being off.

Further, the sound processing device further includes
a first channel assigning module, configured to assign the sound corresponding to the first virtual object to a first channel; and
The sound adjusting module is configured to adjust, in the first channel, the sound according to the sound parameter to obtain the sound corresponding to the state of the first virtual object.

Further, the sound processing device 600 may further include:
a first virtual object display module, configured to superimpose a second virtual object in the video image in response to receiving a third trigger signal;
a first attribute information acquiring module, configured to acquire attribute information of the second virtual object;
a first sound and parameter acquiring module, configured to acquire a sound and a sound parameter corresponding to the second virtual object according to the attribute information of the second virtual object;
a second channel assigning module, configured to assign the sound corresponding to the second virtual object to a second channel;
a first sound adjusting module, configured to adjust, in the second channel, the sound corresponding to the second virtual object according to the sound parameter corresponding to the second virtual object to obtain a sound corresponding to a state of the second virtual object; and
a first attribute adjusting module, configured to adjust a value of a first attribute of the sound corresponding to the state of the second virtual object to obtain an adjusted sound corresponding to the state of the second virtual object.

According to one or more embodiments of the present disclosure, an electronic device is provided, including:
a memory, storing computer readable instructions; and a processor, configured to execute the computer readable instructions to perform the sound processing method according to any embodiments in the present disclosure.

According to one or more embodiments of the present disclosure, a non-transitory computer-readable storage medium is provided, storing computer readable instructions, where the computer readable instructions, when being executed by a computer, cause the computer to perform the sound processing method according to any embodiments in the present disclosure.

The above merely describes preferred embodiments of the present disclosure and illustrates the technical principles. Those skilled in the art should understand that the scope of the disclosure is not limited to the technical solutions formed by the specific combination of the above-mentioned technical features, and should also cover, without departing from the above disclosed concept, the technical solutions formed by any combination of the above-mentioned technical features or other equivalent features. For example, a technical solution may be formed by replacing a feature with another feature having similar function disclosed in the present disclosure (but not limited to).

The invention claimed is:

1. A sound processing method, comprising:
   acquiring a video image from a video source in response to receiving a first trigger signal;
   superimposing a first virtual object in the video image in response to receiving a second trigger signal;
   acquiring attribute information of the first virtual object, wherein the acquiring attribute information of the first virtual object further comprises:
      acquiring serial number information of the first virtual object, wherein the serial number information uniquely identifies the first virtual object,
      acquiring display information of the first virtual object, wherein the display information indicates whether the first virtual object is being displayed,
      acquiring display position information of the first virtual object, wherein the display position information is coordinates of the first virtual object in the video image, and
      acquiring form information of the first virtual object, wherein the form information is one or more of shape information, size information, and color information of the first virtual object;
   acquiring a sound and a sound parameter corresponding to the first virtual object according to the attribute information; and
   adjusting the sound according to the sound parameter to obtain a sound corresponding to a state of the first virtual object.

2. The sound processing method according to claim 1, wherein the superimposing a first virtual object in the video image in response to receiving a second trigger signal comprises:
   superimposing, in response to detecting that a first target object in the video image performs a first action, the first virtual object at a predetermined position on the first target object.

3. The sound processing method according to claim 1, wherein the acquiring a sound and a sound parameter corresponding to the first virtual object according to the attribute information comprises:
   acquiring a sound material corresponding to the first virtual object according to the serial number information of the first virtual object;
   acquiring a playing parameter of the sound according to the display information of the first virtual object, wherein the playing parameter is used to determine whether to play the sound;
   acquiring a first control parameter of the sound according to the display position information of the first virtual object, wherein the first control parameter is used to determine a playing distance of the sound; and
   acquiring a second control parameter of the sound according to the form information of the first virtual object, wherein the second control parameter is used to determine an attribute of the sound.

4. The sound processing method according to claim 3, wherein the adjusting the sound according to the sound parameter to obtain a sound corresponding to a state of the first virtual object comprising:
   playing the sound material corresponding to the first virtual object, in response to the playing parameter being playing;
   adjusting the playing distance of the sound according to the first control parameter; and
   adjusting the attribute of the sound according to the second control parameter.

5. The sound processing method according to claim 3, wherein the adjusting the sound according to the sound parameter to obtain a sound corresponding to a state of the first virtual object comprises:
   turning off the sound corresponding to the first virtual object in response to the playing parameter being off.

6. The sound processing method according to claim 1, wherein
   after the acquiring a sound and a sound parameter corresponding to the first virtual object according to the attribute information, the method further comprises:
   assigning the sound corresponding to the first virtual object to a first channel; and
   the adjusting the sound according to the sound parameter to obtain a sound corresponding to a state of the first virtual object comprises:
   adjusting, in the first channel, the sound according to the sound parameter to obtain the sound corresponding to the state of the first virtual object.

7. The sound processing method of claim 6, wherein the method further comprises:
   superimposing a second virtual object in the video image in response to receiving a third trigger signal;
   acquiring attribute information of the second virtual object;
   acquiring a sound and a sound parameter corresponding to the second virtual object according to the attribute information of the second virtual object;
   assigning the sound corresponding to the second virtual object to a second channel;
   adjusting, in the second channel, the sound corresponding to the second virtual object according to the sound parameter corresponding to the second virtual object to obtain a sound corresponding to a state of the second virtual object; and
   adjusting a value of a first attribute of the sound corresponding to the state of the second virtual object to obtain an adjusted sound corresponding to the state of the second virtual object.

8. A sound processing apparatus, comprising:
   at least one processor; and at least one memory communicatively coupled to the at least one processor and storing instructions that upon execution by the at least one processor cause the apparatus to:
acquire a video image from a video source in response to receiving a first trigger signal;
superimpose a first virtual object in the video image in response to receiving a second trigger signal;
acquire attribute information of the first virtual object, wherein acquiring attribute information of the first virtual object further comprises:
acquiring serial number information of the first virtual object, wherein the serial number information uniquely identifies the first virtual object,
acquiring display information of the first virtual object, wherein the display information indicates whether the first virtual object is being displayed,
acquiring display position information of the first virtual object, wherein the display position information is coordinates of the first virtual object in the video image, and
acquiring form information of the first virtual object, wherein the form information is one or more of shape information, size information, and color information of the first virtual object;
acquire a sound and a sound parameter corresponding to the first virtual object according to the attribute information; and
adjust the sound according to the sound parameter to obtain a sound corresponding to a state of the first virtual object.

9. The apparatus of claim 8, the at least one memory further storing instructions that upon execution by the at least one processor cause the apparatus to:
superimpose, in response to detecting that a first target object in the video image performs a first action, the first virtual object at a predetermined position on the first target object.

10. The apparatus of claim 8, the at least one memory further storing instructions that upon execution by the at least one processor cause the apparatus to:
acquire a sound material corresponding to the first virtual object according to the serial number information of the first virtual object;
acquire a playing parameter of the sound according to the display information of the first virtual object, wherein the playing parameter is used to determine whether to play the sound;
acquire a first control parameter of the sound according to the display position information of the first virtual object, wherein the first control parameter is used to determine a playing distance of the sound; and
acquire a second control parameter of the sound according to the form information of the first virtual object, wherein the second control parameter is used to determine an attribute of the sound.

11. The apparatus of claim 10, the at least one memory further storing instructions that upon execution by the at least one processor cause the apparatus to:
play the sound material corresponding to the first virtual object, in response to the playing parameter being playing;
adjust the playing distance of the sound according to the first control parameter; and
adjust the attribute of the sound according to the second control parameter.

12. The apparatus of claim 10, the at least one memory further storing instructions that upon execution by the at least one processor cause the apparatus to:
turning off the sound corresponding to the first virtual object in response to the playing parameter being off.

13. The apparatus of claim 8, the at least one memory further storing instructions that upon execution by the at least one processor cause the apparatus to:
assign the sound corresponding to the first virtual object to a first channel; and
adjust, in the first channel, the sound according to the sound parameter to obtain the sound corresponding to the state of the first virtual object.

14. The apparatus of claim 13, the at least one memory further storing instructions that upon execution by the at least one processor cause the apparatus to:
superimpose a second virtual object in the video image in response to receiving a third trigger signal;
acquire attribute information of the second virtual object;
acquire a sound and a sound parameter corresponding to the second virtual object according to the attribute information of the second virtual object;
assign the sound corresponding to the second virtual object to a second channel;
adjust, in the second channel, the sound corresponding to the second virtual object according to the sound parameter corresponding to the second virtual object to obtain a sound corresponding to a state of the second virtual object; and
adjust a value of a first attribute of the sound corresponding to the state of the second virtual object to obtain an adjusted sound corresponding to the state of the second virtual object.

15. A non-transitory computer-readable storage medium, storing computer readable instructions, wherein the computer readable instructions, when being executed by a computer, cause the computer to:
acquire a video image from a video source in response to receiving a first trigger signal;
superimpose a first virtual object in the video image in response to receiving a second trigger signal;
acquire attribute information of the first virtual object, wherein acquiring attribute information of the first virtual object further comprises:
acquiring serial number information of the first virtual object, wherein the serial number information uniquely identifies the first virtual object,
acquiring display information of the first virtual object, wherein the display information indicates whether the first virtual object is being displayed,
acquiring display position information of the first virtual object, wherein the display position information is coordinates of the first virtual object in the video image, and
acquiring form information of the first virtual object, wherein the form information is one or more of shape information, size information, and color information of the first virtual object;
acquire a sound and a sound parameter corresponding to the first virtual object according to the attribute information; and
adjust the sound according to the sound parameter to obtain a sound corresponding to a state of the first virtual object.

16. The non-transitory computer-readable storage medium of claim 15, further storing computer readable instructions that upon execution by the computer cause the computer to:
    superimpose, in response to detecting that a first target object in the video image performs a first action, the first virtual object at a predetermined position on the first target object.

17. The non-transitory computer-readable storage medium of claim 15, further storing computer readable instructions that upon execution by the computer cause the computer to:
    acquire a sound material corresponding to the first virtual object according to the serial number information of the first virtual object;
    acquire a playing parameter of the sound according to the display information of the first virtual object, wherein the playing parameter is used to determine whether to play the sound;
    acquire a first control parameter of the sound according to the display position information of the first virtual object, wherein the first control parameter is used to determine a playing distance of the sound; and
    acquire a second control parameter of the sound according to the form information of the first virtual object, wherein the second control parameter is used to determine an attribute of the sound.

18. The non-transitory computer-readable storage medium of claim 17, further storing computer readable instructions that upon execution by the computer cause the computer to:
    play the sound material corresponding to the first virtual object, in response to the playing parameter being playing;
    adjust the playing distance of the sound according to the first control parameter; and
    adjust the attribute of the sound according to the second control parameter.

19. The non-transitory computer-readable storage medium of claim 17, further storing computer readable instructions that upon execution by the computer cause the computer to:
    turning off the sound corresponding to the first virtual object in response to the playing parameter being off.

20. The non-transitory computer-readable storage medium of claim 15, further storing computer readable instructions that upon execution by the computer cause the computer to:
    assign the sound corresponding to the first virtual object to a first channel; and
    adjust, in the first channel, the sound according to the sound parameter to obtain the sound corresponding to the state of the first virtual object.

\* \* \* \* \*